United States Patent [19]

Oldham et al.

[11] Patent Number: 4,910,050

[45] Date of Patent: Mar. 20, 1990

[54] METHOD AND COMPOSITION FOR PROVIDING ELECTROSTATIC DISCHARGE PROTECTION FOR SPACECRAFT

[75] Inventors: Susan L. Oldham, Torrance; Desiree S. Prior, Westchester, both of Calif.

[73] Assignee: Hughes Aircraft Company, Los Angeles, Calif.

[21] Appl. No.: 228,370

[22] Filed: Aug. 4, 1988

[51] Int. Cl.$^4$ ............................................. B05D 3/02
[52] U.S. Cl. ..................... 427/386; 244/1 A; 244/158 A; 244/163; 427/387; 428/413; 428/421; 428/447; 428/473.5; 428/480; 252/518
[58] Field of Search ............... 244/1 A, 158 A, 163; 427/387, 386; 428/413, 421, 447, 473.5, 480; 252/518

[56] References Cited

U.S. PATENT DOCUMENTS

| | | | |
|---|---|---|---|
| 4,317,855 | 3/1982 | Guillaumon et al. | 428/212 |
| 4,433,201 | 2/1984 | Fellas | 136/251 |
| 4,629,527 | 12/1986 | Livi et al. | 156/285 |
| 4,663,234 | 5/1987 | Bouton | 428/422 |

OTHER PUBLICATIONS

Rancount and Taylor, "Preparation and Properties of Surface-Conductive Polyimide Films via in Situ Co-deposition of of Metal Salts", Macromolecules, vol. 20, 1987, pp. 790-795.

A. K. St. Clair et al., "Incorporation of Metal Related Materials into Electrically Neutral Polymers", J. Macromol. Sci.-Chem A16(1), 1981, pp. 95-137.

*Primary Examiner*—Michael Lusignan
*Assistant Examiner*—Nicholas Krisch
*Attorney, Agent, or Firm*—Mary E. Lachman; W. K. Denson-Low

[57] ABSTRACT

A method and composition which provides both thermal; control and electrostatic discharge protection to bodies in the space environment. The composition comprises: (a) a chosen polymer or resin that forms a polymer that is an electronic insulator and is suitable for space applications; and (b) a selected lithium salt as a dopant wherein said composition, when formed into a film or coating, provides a semiconductive film or coating having a volume resistivity of about $10^6$ to $10^{11}$ ohm-centimeter and a value of solar absorptance/total normal emittance within the range of about 0.305 to 0.595. In an alternative embodiment, the composition may optionally include tantalum pentoxide.

17 Claims, No Drawings

METHOD AND COMPOSITION FOR PROVIDING ELECTROSTATIC DISCHARGE PROTECTION FOR SPACECRAFT

BACKGROUND OF THE INVENTION

1. Field of the Invention

The present invention is directed to a method and composition for protecting spacecraft from electrostatic discharge and thermal effects, and, more particularly, to a polymer composition incorporating lithium salts and optionally tantalum pentoxide and the method of use of such a composition.

2. Description of Related Art

Satellites and spacecraft must be able to withstand the stringent conditions imposed by the space environment, such as temperature extremes (e.g. −156° C. or −250° F. to 121° C. or 250° F.) for extended periods of time and space vacuum. In particular, an on going problem for spacecraft has been the difficulty of providing thermal control in order to maintain the electronics and batteries on the spacecraft at or near room temperature to optimize their performance. In addition, some structural components used in spacecraft are formed of organic materials which can be damaged when exposed to a temperature above 200° F. (93° C.), for example. Consequently, these components must be cooled in order to avoid structural damage.

The central problem in thermal control for spacecraft is the absence of convection in the space environment, where objects cool only by radiation, which is far less effective in transferring heat than conduction. This problem is further complicated by the fact that the heat load due to solar exposure is very high so that temperature extremes are frequently encountered.

Any object constantly emits electromagnetic radiation in all directions. If the object is below about 1000° F. (538° C.), the energy is infrared, which is invisible to the human eye. The amount of energy emitted is directly related to a parameter called "emissivity," normally denoted as $\epsilon$. When a surface is exposed to electromagnetic radiation, such as sunlight, the radiation is partially absorbed, partially reflected, and if the body is transparent or translucent, partially transmitted. The relation between the three energy components is given by the conservation equation $$\alpha + \rho + \tau = 1$$

where
- $\alpha$ = absorptivity: the fraction of the incident radiation absorbed by the body
- $\rho$ = reflectivity: the fraction of the incident radiation reflected from the surface
- $\tau$ = transmissivity: the fraction of the incident radiation which passes through the body, i.e., is transmitted The relative magnitudes of $\alpha$, $\rho$, and $\tau$ depend not only on the material properties, temperature, and geometry, but also on the wavelength or spectrum of the radiation. For most of the materials of present interest, $\tau$ is small (less than 0.01), and can be considered zero. In general, a material with low $\alpha$ is relatively unaffected by sunlight; a surface with high $\epsilon$ is a good heat rejector; and a surface with a low $\alpha/\epsilon$ ratio tends to stay cold when illuminated.

Thermal control of spacecraft has been achieved by using films or multilayer blankets of a dielectric material, such as Kapton (a polyimide which is a registered trademark of E. I. DuPont) or Teflon (a polytetrafluoroethylene which is a registered trademark of E. I. DuPont). These films are coated with aluminum or silver on the inner surface of the film to achieve high reflectance and low absorptivity. A thermal control blanket may be formed, for example, from several (e.g. 3 to 6) layers of Kapton film which have been aluminized on one surface and which are assembled such that contact between adjacent layers is minimized. The thermal control blanket is applied to the exterior surface of the part to be protected. However, the dielectric inner layers of such a thermal control blanket become charged when high energy particles in space penetrate the outer metallized layers and become fixed in the inner layers of the blanket. This charge can accumulate to a high level, at which time electrostatic discharge can occur, as discussed below.

A spacecraft in the space environment is exposed to numerous charged particles and radiation. Static charge builds up in portions of the spacecraft in the form of excess electrons. A voltage differential builds up between separate portions of the spacecraft and can reach levels sufficient to cause electrostatic discharge between various surfaces in the spacecraft or arcing to structural ground. These discharges can damage or degrade electronic circuits, which can produce such significant problems as a power outage, temporary loss of communication to the ground, or loss of system control functions. In addition, these static discharges can degrade the optical properties of thermal control surfaces.

Fortunately, the problem of static discharge is somewhat alleviated in some cases since radiation from the sun causes the emission of stored electrons, to thus neutralize the static charge buildup. Consequently, for a satellite which spins continuously, that is, a spin-stabilized satellite, static charge buildup is somewhat alleviated since only a small fraction of the satellite is in shadow long enough to build up electrostatic discharge and this charge is dissipated by solar photons in each spin cycle. However, for a satellite which does not spin continuously, that is, a body-stabilized satellite, one half of the satellite is always in shadow. The shadowed areas cannot photoemit stored electrons efficiently compared to the adjacent sun-illuminated areas. A voltage differential is thus produced and gives rise to electrostatic discharge events. In addition, the rear surfaces of the flat solar panels used in satellites cannot bleed off electrostatic charge at a rate greater than the geomagnetic plasma can charge them in a body-stabilized satellite.

At the present, attempts to reduce electrostatic discharge in satellites have included the use of outer coatings possessing surface conductivities only (indium tin oxide or germanium), or the use of filter pins in wire harness connectors. Filter pins in wire harness connectors have the disadvantage that they merely attenuate electrostatic discharge events, but do not prevent them. With respect to the thin coatings (100 to 2000 Å), they are fragile, costly, and provide surface conductivities only. They do not provide protection from geomagnetic plasma storms since they can be easily penetrated by electrons with energies as low as 5 keV, allowing the underlying structure to electrostatically charge.

Thus, a need exists in the field of spacecraft and satellites for a material composition which can provide thermal control and at the same time protect against electrostatic discharge in space.

SUMMARY OF THE INVENTION

The general purpose of the present invention is to provide a new composition which provides both thermal control and electrostatic discharge protection to bodies in the space environment, and further to provide a method of using such compositions. This composition and method possess most, if not all, of the advantages of the prior art materials and methods while overcoming their above-mentioned significant disadvantages.

The above-described general purpose of the present invention is accomplished by providing a new composition comprising: (a) a chosen polymer or resin that forms a polymer that is an electronic insulator and is suitable for space applications; and (b) a selected lithium salt as a dopant wherein said composition, when formed into a layer (film or coating), provides a semiconductive film or coating having a volume resistivity of about $10^6$ to $10^{11}$ ohm-centimeters and a value of solar absorptance/total normal emittance within tee range of about 0.305 to 0.595. In an alternative embodiment, the composition may optionally comprise tantalum pentoxide.

DESCRIPTION OF THE PREFERRED EMBODIMENTS

Compositions in accordance with the present invention are formed into films or coatings which provide both thermal control and electrostatic discharge protection for spacecraft. The basic polymer is chosen to be one which is suitable for space applications, namely having resistance to degradation by ultraviolet radiation, high energy particles, and high temperatures. In addition, the resin of the polymer, used in the present composition must possess good handleability or processing parameters. (As used herein, the term "resin" means a mixture comprising a polymer precursor, from which the polymer is subsequently formed.) The polymer used in the present invention must form a non-brittle film or coating which has certain specified optical properties. For example, for some uses, it may be desirable to have an optically transparent material, while for other uses a white material may be satisfactory. However, as the color of the polymer proceeds toward the black end of the spectrum, the polymer becomes highly absorptive of solar radiation and unsuitable for the present invention. Polymers suitable for use in accordance with the present invention include, but are not limited to, epoxy, epoxy-siloxane, epoxy-silane, silicone, polyimide-siloxane, fluorinated polyimide, fluorinate polyester and fluorinated polyimide siloxane materials.

In accordance with a first embodiment of the present invention, the composition comprises the unpolymerized polymer precursor which is mixed with the dopant described below, and the mixture is subsequently polymerized to provide a polymer film or coating. In a second embodiment of the present invention, the composition comprises the polymer which is mixed with the dopant, and the mixture is formed into a layer or film of the polymer. If the polymerized material is soluble, such as a fluorinated polyimide, fluorinated polyimide-siloxane or fluorinated polyester material, it may be mixed directly with the dopant. However, if the polymerized material is insoluble, such as an epoxy, silicone, epoxy siloxane, epoxy-silane, or polyimide-siloxane material, the polymer precursor is used as the starting material and is mixed with the dopant and subsequently polymerized.

We have discovered that incorporation of a lithium salt that is compatible with the polymer into the polymer renders the polymer ionically conductive, to form a material that provides electrostatic discharge protection. This material possesses both surface and bulk (or volume) resistivities that are needed for this purpose. Bulk resistivities within the range of about $10^6$ to $10^{11}$ ohm-centimeter were obtained. Value lower than $10^6$ ohm centimeter for bulk resistivity are not desirable since the material then becomes too conductive and intermodulation problems and electronic cross talk occur. Values higher than $10^{11}$ ohm-centimeter do not provide the desired electrostatic discharge protection. Furthermore, the films or layers formed from the present composition have uniform semiconductive properties throughout the thickness of the film without any gradients from the outer surface to the inner surface of the film or layer.

The particular lithium salt and the amount thereof which is used in the present composition depend on the properties of the basic polymer. For a resin which has a low glass transition temperature (Tg) and is flexible, such as an epoxy or an epoxy-siloxane, the preferred dopant in accordance with the present invention is lithium tetrafluoroborate ($LiBF_4$). For a low Tg material, relatively small amounts of $LiBF_4$ can produce the desired effect. However, for a resin which has a higher Tg and is more rigid, such as a polyimide, it is more difficult to produce ionic mobility and a higher percentage of $LiBF_4$ would be needed to produce the desired effect. Unfortunately, at this higher percentage, the $LiBF_4$ precipitates out. Consequently, for resins with a high Tg, a different dopant is needed. It has been found that the lithium salt of perfluorooctanoic acid is effective for this purpose for the fluorinated polyimide SIXEF-44 obtained from Hoechst Celanese of Coventry, R.I. Similar compounds having an alkyl group of 2 to 12 carbon atoms will work as well as the octanoic compound noted above. The dopant for this fluorinated polyimide contains fluorine substituents for compatibility with the polymer. For other polymers, the dopant used would comprise the lithium salt of a $C_2$ to $C_{12}$ acid or alcohol in which the $C_2$ to $C_{12}$ group is substituted with a radical that is compatible with the groups in the backbone of the polymer. The term "compatible" as used herein means incorporating a moiety found in the polymer chain. For example, a dopant incorporating silicon is used for a silicone polymer, or a dopant incorporating fluorine is used for a fluorinated polymer. This dopant has the general Formula I below:

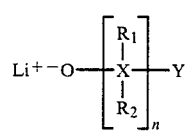

Formula I where X is selected from the group consisting of:

-continued

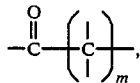

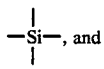

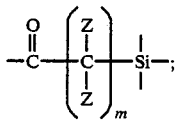

n=1 to 11,
m=3 to 11,
Y=H, C1 to C4 alkyl, OH, or halogen,
Z=H or halogen,
$R_1$ and $R_2$ are each a substituent compatible with the polymer;
For X=

in Formula I, the dopant comprises the salt of an alcohol; for X=

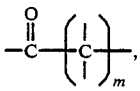

the dopant comprises the salt of an acid; for X=

the dopant comprises the salt of a silanol; and for X=

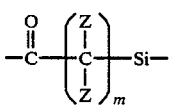

the dopant comprises the salt of a silylcarboxylic acid. In the special case of a silicone material, if an acid group is located next to the silicone group, the material is unstable and the acid is cleaved upon exposure to moisture. Consequently, in order to provide a stable dopant, the acid group must be located on an organic group attached to the silicone group, as indicated above.

The compatibility of the dopant with the polymer is needed in order to achieve the desired ionic mobility. For example, for a silicone polymer, the lithium salt of a silanol or silylcarboxylic acid is expected to produce the increased ionic conductivity in accordance with the present invention. The lithium salt is incorporated in the composition of the present invention in the amount of 1 to 75 parts per hundred of resin or polymer, preferably 1 to 9 parts per hundred of resin or polymer. If the starting material comprises the polymer precursor, the dopant becomes incorporated in the polymer chain when polymerization occurs. If the starting material comprises the polymer material, the dopant becomes incorporated in the polymer chain by an exchange reaction or other reaction in which existing bonds in the polymer are broken and new bonds are formed to the dopant.

Moreover, the compositions in accordance with the present invention provide coatings or films having thermo-optical properties which make them efficient thermal control materials. The value of $\alpha_s/\epsilon_{TN}$, or solar absorptance/total normal emittance, is a measure of how much heat a material absorbs and emits and is indicative of how hot the material will get. Low values of $\alpha_s/\epsilon_{TN}$ are desirable for thermal control materials. The compositions in accordance with the present invention have been found to have values of $\alpha_s/\epsilon_{TN}$ within the range of about 0.305 to 0.595, which values are indicative of a good thermal control material. These compositions have the added advantage of being transparent to radio frequency energy.

Further, in accordance with an alternative embodiment of the present invention, we have discovered that the addition of tantalum pentoxide to the above-described composition produces a synergistic effect between the tantalum pentoxide and the lithium salt to provide both electronic and ionic conductivity, which lowers the resistance of the composition significantly as compared to tantalum pentoxide alone. The tantalum pentoxide may be incorporated in the compositions of the present invention in the amount of 0.1 to 80 parts per hundred of resin or polymer, preferably 20 to 40 parts per hundred of resin or polymer.

A composition in accordance with the present invention was prepared comprising an epoxy resin and 9 parts per hundred resin (phr) of lithium tetrafluoroborate as described in Example 1 herein. A second composition was prepared comprising the same epoxy resin and 9 phr of sodium tetraphenylborate. The volume resistivities of the cured films were measured to be $2\times10^{11}$ ohm cm and $4\times10^{12}$ ohm-cm, respectively, as compared to a value of $>10^{15}$ ohm cm for the epoxy resin alone. The addition of $LiBF_4$ in accordance with the present invention was found to contribute to faster gelation of the uncured composition and lower volume resistivity than the addition of sodium tetraphenylborate.

Two additional compositions in accordance with the present invention were prepared comprising an epoxy novalac, 30% by weight tantalum pentoxide, and $LiBF_4$ as described in Example 3 herein. In one composition, 2% $LiBF_4$ was used, and in the second composition 4% $LiBF_4$ was used. The volume resistivities of the cured films were measured to be $4\times10^{12}$ ohm-cm and $7\times10^9$ ohm cm. Based on these results, it was concluded that polymers having a higher glass transition temperature needed higher concentrations of salt in accordance with the present invention.

Additional resistivity studies were performed on a polymer film formed from a composition in accordance with the present invention comprising an epoxy siloxane resin, lithiumtetrafluoroborate, and tantalum pentoxide, as indicated in the first item in Table I. For comparison, polymer films formed from other compositions comprising the same epoxy-siloxane resin and other salts and/or fillers were tested and these results are indicated in Table I. As can be seen from Table I, the composition in accordance with the present invention provides polymer films having the optimized balance between a low volume resistivity and a low value of $\alpha_s/\epsilon_{TN}$, while at the same time providing a white film.

indicated in Table II. For comparison, polymer films formed from other compositions comprising the same fluorinated polyimide and other additives were tested and these results are indicated in Table II. As can be seen from Table II, these polymer films formed from

TABLE I
RESISTIVITY AND THERMO-OPTICAL TESTS OF EPOXY-SILOXANE COMPOSITION

| Additive Salt | Additive Filler | Additive Concentration (phr) Salt | Additive Concentration (phr) Filler | Volume Resistivity ($\Omega$-cm) | Color | $\alpha_s$ | $\epsilon_{TN}$ | $\alpha_s/\epsilon_{TN}$ |
|---|---|---|---|---|---|---|---|---|
| LiBF$_4$ | Ta$_2$O$_5$ | 2 | 30 | $1 \times 10^8$ | White | 0.289 (0.284)+ | 0.928+ | 0.309 |
| None | None | — | — | $>10^{12}$ | Clear, yellow | 0.227 | — | — |
| LiBF$_4$ | None | 10$^a$ | — | $7 \times 10^7$ | Clear, yellow | — | — | — |
| NaB$\phi_4$ | None | 10$^a$ | — | $4 \times 10^8$ | Clear, yellow | — | — | — |
| None | Sb/In$_2$O$_3$ | — | 100 | $6 \times 10^4$ | Green | — | — | — |
| None | Sb/In$_2$O$_3$ | — | 30 | $10^7$ | Green | — | — | — |
| None | W-10 (KR9) | — | 30 (0.25) | $1 \times 10^{11}$ | Grey | 0.555 | 0.933 | 0.595 |
| LiBF$_4$ | W-10 | 1 | 30 | $2 \times 10^9$ | Grey | 0.564 | 0.890 | 0.634 |
| LiBF$_4$ | W-10 | 2 | 30 | $8 \times 10^8$ | Grey | — | — | — |
| None | TiO$_2$ | — | 30 | $1 \times 10^{11}$ | White | 0.235 | 0.878 | 0.268 |
| LiBF$_4$ | TiO$_2$ | 1 | 30 | $2 \times 10^9$ | White | 0.241 (0.231)+ | 0.910+ | 0.259 |
| LiBF$_4$ | BF$_3$/TiO$_2$ | 1 | 30 | $2 \times 10^9$ | White | 0.250 (0.196)+ | 0.906+ | 0.246 |
| None | SnO$_2$ | — | 30 | $5 \times 10^{10}$ | Grey | — | — | — |
| None | BF$_3$/SnO$_2$ | — | 30 | $1 \times 10^{10}$ | Grey | — | — | — |
| LiBF$_4$ | BF$_3$/SnO$_2$ | 2 | 30 | $1 \times 10^9$ | Grey | — | — | — |
| None | Ta$_2$O$_5$ | — | 30 | $7 \times 10^{11}$ | White | 0.331 (0.305)+ | 0.905 (0.908)+ | 0.351 |
| None | BF$_3$/Ta$_2$O$_5$ | — | 30 | $3 \times 10^{11}$ | White | — | — | — |
| LiBF$_4$ | BF$_3$/Ta$_2$O$_5$ | 2 | 30 | $1 \times 10^{10}$ | White | 0.304 (0.280)+ | 0.922+ | 0.317 |
| None | In$_2$O$_3$ | — | 30 | $2 \times 10^{10}$ | Yellow | 0.589+ | 0.927+ | 0.635 |
| LiBF$_4$ | In$_2$O$_3$ | 2 | 30 | $2 \times 10^{10}$ | Yellow | 0.436 | 0.913+ | 0.478 |

NOTES:
LiBF$_4$ -lithium tetrafluoroborate, obtained from Aldrich Chemical Co
NaB$\phi_4$ -sodium tetraphenylborate, obtained from Alpha Products, Morton Thiokol Inc.
Sb/In$_2$O$_3$ -antimony-doped indium oxide, obtained from Indium Corporation
W-10 -antimony-doped tin oxide/titanium oxide, obtained from Mitsubishi Gas and Chemical Co.
KR9 -isopropyltri(dodecyl)benzenesulfonyl titanate, obtained from Kenrich Petrochemicals
TiO$_2$ -titanium dioxide, Ti-Pure-R-900, obtained from E. I. Dupont
BF$_3$/TiO$_2$ -boron trifluoride doped titanium oxide
SnO$_2$ -tin oxide
BF$_3$/SnO$_2$ -boron trifluoride doped tin oxide
Ta$_2$O$_5$ -tantalum pentoxide, obtained from Shieldalloy Corporation
BF$_3$/Ta$_2$O$_5$ -boron trifluoride doped tantalum pentoxide
In$_2$O$_3$ -indium oxide, obtained from Aesar
$^a$no pot life
+ -Tested with reflectometer instead of spectrophotometer
phr -parts per hundred of resin
$\alpha_s$ -solar absorptance
$\epsilon_{TN}$ -total normal emittance These compositions were prepared and processed as described in Example 2. It is anticipated that epoxy-silane and silicone materials would exhibit behavior similar to that of the epoxy-siloxane described above when used in the compositions of the present invention. With regard to items 3 and 4 in Table I, it was noted that these compositions in accordance with the present invention had lower volume resistivities. However, these compositions were not viable since they had no pot life due to cure acceleration.

Further resistivity studies were performed on a polymer film formed from a composition in accordance with the present invention comprising the fluorinated polyimide SIXEF-44 obtained from Hoechst Celanese, and additives in accordance with the present invention, as compositions in accordance with the present invention (items 1-5) also provide the above-noted balance between low volume resistivity and low $\alpha_s/\epsilon_{TN}$. These samples were prepared and processed as described in Example 4 herein. In addition, items 3-5 of Table II, which represent a preferred embodiment of the present invention, indicate that, for a given film, the values for volume resistivity and surface resistivity on both the air and glass sides are substantially the same. These results indicate the uniformity in the conductivity of these films throughout their thickness. This uniform conductivity of the films of the present invention prevents the unwanted accumulation of charge in the inner surface of the film.

TABLE II
RESISTIVITY TESTS OF FLUORINATED POLYIMIDE COMPOSITION

| Item | Additive | Additive Concentration (phr) | $\rho_v^{(a)}$ ($\Omega$-cm) | $R_{s,glass}^{(b)}$ ($\Omega/\square$) | $R_{s,air}^{(c)}$ ($\Omega/\square$) | Film Appearance |
|---|---|---|---|---|---|---|
| 1 | Ta$_2$O$_5$/LiBF$_4$ | 30/2 | $2 \times 10^{13}$ | $>10^{12.5}$ | $>10^{12.5}$ | Off white, homogeneous |

TABLE II-continued
RESISTIVITY TESTS OF FLUORINATED POLYIMIDE COMPOSITION

| Item | Additive | Additive Concentration (phr) | $\rho_v{}^{(a)}$ ($\Omega$-cm) | $R_{s,glass}{}^{(b)}$ ($\Omega/\square$) | $R_{s,air}{}^{(c)}$ ($\Omega/\square$) | Film Appearance |
|---|---|---|---|---|---|---|
| | | 30/4$^{(f)}$ | $3 \times 10^{10}$ | — | — | White, voidy |
| | | 30/5$^{(f)}$ | $2 \times 10^{15}$ | $>10^{12.5}$ | $>10^{12.5}$ | Beige, inhomogeneous |
| 2 | $C_7F_{15}CO_2Li/$ | 30/30$^{(e)}$ | $1 \times 10^{13}$ | $>10^{12.5}$ | $>10^{12.5}$ | White, homogeneous |
| | $Ta_2O_5{}^{(d)}$ | 50/0$^{(e)}$ | $3 \times 10^{12}$ | $10^9$ | $10^9$ | White, homogeneous |
| | | 80/0$^{(e)}$ | $1 \times 10^{14}$ | $>10^{12.5}$ | $>10^{12.5}$ | White, homogeneous |
| | | 80/30$^{(e)}$ | $1 \times 10^{12}$ | $10^{10}$ | $10^{10}$ | White, homogeneous |
| | | 80/30$^{(e,g)}$ | $5 \times 10^{11}$ | $10^{11}$ | $10^{11}$ | White, homogeneous |
| | | 80/30$^{(e,h)}$ | $7 \times 10^{11}$ | $10^{10}$–$10^{11}$ | $10^{10}$–$10^{11}$ | White, homogeneous |
| | | 40/20$^{(e,h)}$ | $4 \times 10^{11}$ | — | — | White, homogeneous |
| 3 | $C_7F_{15}CO_2Li^{(e)}$ | 40 | $4 \times 10^{10}$ | $10^{10}$ | $10^{10}$ | White, homogeneous |
| 4 | $C_7F_{15}CO_2Li/TEA^{(q)}$ | 40/3 | $3 \times 10^{10}$ | $10^9$ | $10^9$ | White, homogeneous |
| 5 | $C_7F_{15}CO_2Li^{(r)}$ | 40 | $3 \times 10^{11}$ | $10^{10}$ | $10^{10}$ | White, homogeneous |
| 6 | None | 0 | $9 \times 10^{15}$ | $>10^{12.5}$ | $>10^{12.5}$ | Clear |
| 7 | $LiBF_4$ | 6 | $7 \times 10^{11}$ | $10^{11}$ | $10^{12}$ | Opaque, salt precipitated |
| 8 | $NaB\Phi_4$ | 8 | $3 \times 10^{12}$ | $>10^{12.5}$ | $>10^{12.5}$ | Opaque, salt precipitated |
| 9 | 6FDA-Li$^{(i)}$ | 33 | $2 \times 10^{14}$ | $\geq 10^{12}$ | $\geq 10^{12}$ | Clear |
| | | Excess | $3 \times 10^{10}$ | $10^{11}$ | $10^{11}$ | Striated |
| 10 | 6FPA-Li$^{(j)}$ | 27 | $2 \times 10^{13}$ | $\geq 10^{12}$ | $\geq 10^{12}$ | Clear |
| | | 75 | — | — | $10^7$–$10^{12}$ | Clear, voidy brittle |
| 11 | 6FPA-$C_7F_{15}CO_2Li^{(k)}$ | 0 | — | $>10^{12.5}$ | $>10^{12.5}$ | Opaque |
| | | 5 | $3 \times 10^{12}$ | $>10^{12.5}$ | $>10^{12.5}$ | Clear, voidy |
| 12 | Nafion 1100$^{(l)}$ | 50 | — | — | — | Opaque, excessive shrinkage |
| 13 | KZ TPP$^{(m)}$ | 10 | — | — | — | Gelled |
| | LZ 97$^{(n)}$ | 10 | — | — | — | Gelled |
| | KR 55$^{(o)}$ | 10 | $>10^{16}$ | $>10^{12.5}$ | $>10^{12.5}$ | Clear |
| 14 | Ag/Ni sheres$^{(p)}$ | 5 | $2 \times 10^{12}$ | $>10^{12.5}$ | $>10^{12.5}$ | Agglomeration, clear in secs. |
| | | 30 | $2 \times 10^3$ | — | — | Agglomeration, yellow |
| 15 | $Li_2PdCl_4$ | 30 | $6 \times 10^9$ | $10^7$ | $10^{11}$ | Black |

NOTES TO TABLE II
$^{(a)}\rho v$ = volume resistivity
$^{(b)}R_{s,glass}$ = sheet resistance, glass side of film
$^{(c)}R_{s,air}$ = sheet resistance, air side of film
$^{(d)}C_7F_{15}CO_2Li$ = perfluorooctanoic acid-lithium salt
$^{(e)}$Dimethylacetamide (DMAc) used to solvate SIXEF-44 instead of n-methylpyrrolidone (NMP)
$^{(f)}$Toluene/THF blend was used to solvate SIXEF-44 instead of NMP
$^{(g)}$Integral addition of 1% CAVCO Mod A zircoaluminate coupling agent
$^{(h)}Ta_2O_5$ presized with phenethyltrimethoxysilane
$^{(i)}$6FDA-Li = lithium salt of hexafluoroisopropylidene (6F) dianhydride
$^{(j)}$6FPA-Li = lithium salt of 6F polyamic acid (acid prepared from 1:2 molar ratio of 6F diamine (6FDAM) to 6F dianhydride)
$^{(k)}$6FPA-$C_7F_{15}CO_2Li$ = perfluorooctanoic acid-lithium salt of 6F polyamic acid using same acid as prepared in (j)
$^{(l)}$Nafion = polymer of polytetrafluoroethylene with fluorinated ether side chains terminated with sulfonic acid groups, a trademark of E. I. Dupont
$^{(m)}$KZ TPP = tetra [2,2-bis-(allyloxymethyl)butyl]-cyclopyrophosphatozirconate
$^{(n)}$LZ 97 = [2,2-bis-(allyloxymethyl)butyl]-tri-(3-aminophenyl)zirconate
$^{(o)}$KR 55 = tetra [2,2-bis-(allyloxymethyl)-butyl]-titanate-bis [di(tridecyl)phosphate] complex
$^{(p)}$Ag/Ni spheres = silver coated nickel spheres, 250 mesh
$^{(q)}$TEA = triethanolamine
$^{(r)}$Propylene glycol monomethyl ether acetate used to solvate SIXEF-44 and salt By contrast, a film incorporating a prior art lithium palladium chloride dopant, as shown in item 15 of Table II, had higher volume resistivity than surface resistivity (air side) and even had differing surface resistivities for the two sides of the films. Such a film possesses a gradient in conductivity and charge would accumulate in the more insulative portion and lead to electrostatic discharge. It was also noted that such films were black, due to reduction of the palladium salt, which makes them unsuitable for thermal control films.

It is anticipated that other highly fluorinated polymers, such as fluorinated polyesters or fluorinated polyimide siloxanes, would exhibit behavior similar to that of the fluorinated polyimide described above when used in the compositions of the present invention.

Further, polymer films formed from SIXEF-44 compositions in accordance with the present invention were metallized and tested for thermo optical properties as shown in Table III. As previously discussed, metallized films may be stacked one upon the other, and optionally joined such as by stitching, to form a thermal control blanket. As can be seen from the data in Table III, metallized polymer films formed from compositions in accordance with the present invention have values of $\alpha_s/\epsilon_{TN}$ which are between those of silvered Kapton ($\geq 0.50$) and Teflon (0.15).

Thus, from the previous discussion it can be seen that the present invention provides compositions that form films or coatings that have volume resistivities of about $10^6$ to $10^{11}$ ohm centimeter and $\alpha_s/\epsilon_{TN}$ of about 0.305 to 0.595 unmetallized and 0.288 to 0.406 with silver metallization. Such films are capable of providing good electrostatic discharge protection and good thermal control for bodies in space.

Examples of practice of the present invention are as follows.

TABLE III

THERMO-OPTICAL PROPERTIES OF METALLIZED FILM OF FLUORINATED POLYIMIDE COMPOSITION

| Sample | Metallization[a] | Thickness (Inches) | $\alpha_s$[b] | $\epsilon_{TN}$[b] | $\alpha_s/\epsilon_{TN}$ |
|---|---|---|---|---|---|
| 1[c] | none | 0.0008 | 0.464, 0.479 | 0.791, 0.795 | 0.595 |
|  | silver | 0.0008 | 0.225 | 0.781 | 0.288 |
| 2[c] | none | 0.0004 | 0.451, 0.469 | 0.787, 0.789 | 0.584 |
|  | silver | 0.0004 | 0.295 | 0.726 | 0.406 |
| 3[c] | none | 0.0014 | 0.416, 0.418 | 0.868, 0.874 | 0.479 |
|  | silver | 0.0014 | 0.263 | 0.863 | 0.305 |
| 4[c] | chromium/silver | 0.0016 | 0.537 | 0.868 | 0.619 |
| 5[c] | none | 0.0155 | 0.261, 0.273 | 0.841, 0.907 | 0.305 |
|  | chromium/silver | 0.0155 | 0.271 | 0.866 | 0.313 |
| 6[c] | none | 0.0017 | 0.405, 0.405 | 0.865, 0.871 | 0.468 |
|  | silver | 0.0017 | 0.237 | 0.873 | 0.271 |
|  | chromium/silver | 0.0017 | 0.534 | 0.871 | 0.613 |
| 7[d] | silver | 0.0053 | 0.272 | 0.903 | 0.301 |

NOTES:
[a] Metallization consisted of vapor deposition of silver (2000Å, $8 \times 10^{-5}$ in) with or without vapor deposition of chromium strike (200–300Å), on one side of film only
[b] $\alpha_s$ and $\epsilon_{TN}$ were measured on both sides of nonmetallized film (first value is glass side of film, second value is air side of film) and on matte (nonmetallized) side of metallized film
[c] Composition comprising SIXEF-44, 4 phr LiBF$_4$, and 30 phr Ta$_2$O$_5$
[d] Composition comprising SIXEF-44 and additive comprising 80 phr C$_7$F$_{15}$CO$_2$Li and 30 phr Ta$_2$O$_5$; volume resistivity = $5 \times 10^{11}$ ohm-centimeter

EXAMPLE 1

This example illustrates the preparation and testing of a composition in accordance with the present invention comprising an epoxy resin and a lithium salt dopant.

The epoxy material used was the epoxy primer EC 3924 obtained from 3M Corporation of Saint Paul, Minn. (The primer comprised an epoxy prepolymer and additives, such as an adhesion promoter and corrosion inhibitor, which are typically used in primer compositions.) Three compositions were prepared: (a) one comprising 9 parts per hundred resin (phr) of lithium tetrafluoroborate in accordance with the present invention; (b) one comprising 9 phr of sodium tetraphenylborate; and (c) one comprising 6 phr of lithium tetrafluoroborate and 33 phr of the antimony doped tin oxide filler (Tl), obtained from Mitsubishi Gas and Chemical Company. The salt was dissolved in a minimal amount of ethanol (<5 ml) prior to being added to the epoxy primer. The filler, when used, was ball milled into the primer for approximately 15 hours. The primer samples were then applied to 0.0625 inch (0.1588 cm) thick aluminum plates in a 0.001 inch (0.00254 cm) cured film thickness and dried one-half hour at room temperature, followed by one hour at 250° F. (121° C.).

Volume resistivity was determined in accordance with American Society of Testing Materials (ASTM) D257-78, "D-C Resistance or Conductance of Insulating Materials." The volume resistivity of the epoxy - LiBF$_4$ composition in accordance with the present invention was $2 \times 10^{11}$ ohm cm, while that of the epoxy - NaB$\phi_4$ composition was $4 \times 10^{12}$ ohm cm, and that of the epoxy - LiBF$_4$-Tl composition was $2 \times 10^9$ ohm cm. The epoxy primer alone had a volume resistivity of $>10^{15}$ ohm cm. The lowered resistivity produced by the epoxy - LiBF$_4$ -Tl composition indicated to us the synergistic effect which the dopant and filler may have. We investigated this effect further as described in Example 2.

EXAMPLE 2

This example illustrates the preparation and testing of compositions in accordance with the present invention comprising an epoxy-siloxane resin and additives as previously indicated in Table I, as well as compositions comprising the same epoxy-siloxane resin and other additives, for comparison.

The epoxy siloxane material used was 1,3 bis(-glycidyloxypropyl)tetramethyldisiloxane, obtained from Silar Laboratories of Scotia, N.Y. The curing agent comprised 1,3-bis(3-aminopropyl) 1,1,3,3-tetramethyl-1,3-disiloxane (APMD) obtained from Petrarch Systems of Bristol, Pa. or Silar Laboratories. The filler, if used, was ball milled into the resin for approximately fifteen hours. In cases where a salt was used, it was dissolved in a minimal amount of ethanol (<5 milliliters) prior to adding it to the filled or unfilled mix. APMD was added to the resulting mixes at 100% stoichiometry. The mixes were then applied to 0.0625 inch (0.1588 cm) thick aluminum plates in cured film thicknesses varying from 0.005 to 0.035 inches (0.013 to 0.089 cm). The samples were cured for two hours at 160° F. (71° C.). The filler and salt ratios, volume resistivity, color, $\alpha_s$, $\epsilon_{TN}$, and $\alpha_s/\epsilon_{TN}$ values for the various epoxy-siloxane compositions were as previously indicated in Table I.

Volume resistivity was determined on the test samples in accordance with ASTM D257-78. A Beckman DK-2A spectrophotometer with integrating sphere was used to measure $\alpha_s$, except for samples indicated with a "+" in Table I, which were tested with a Gier-Dunkle reflectometer. A Gier-Dunkle reflectometer was used to determine $\epsilon_{TN}$.

As indicated by the data in Table I, the composition in accordance with the present invention comprising $LiBF_4$ and $Ta_2O_5$ (item 1, Table I) was the most promising white system investigated. At 2 phr $LiBF_4$ and 30 phr $Ta_2O_5$, the composition remained processible, possessed a $\rho_v$ of $1 \times 10^8$ $\Omega$-cm, $\alpha_s$ between 0.284 and 0.289, and $\epsilon_{TN}$ of 0.928. The ratio of $\alpha_s/\epsilon_{TN}$ was in the same range as currently used spacecraft white paints (i.e., S13-G, made from potassium silicate treated zinc oxide pigment in a methylsilicone based binder, available from IIT Research Institute, Chicago, Ill.). These results for resistivity and $\alpha_s/\epsilon_{TN}$ indicate the suitability of the present composition for electrostatic discharge protective white spacecraft coatings.

The data in Table I also shows that a clear conducting epoxy siloxane system was produced only when the salts were used alone, i.e., without the filler. Although the epoxy siloxane yellows during cure, the pre cured films containing the salts were colorless. The intense color of the fillers masked this yellowing in the salt-/filler systems. The use of high concentrations of either $LiBF_4$ or $NaB\phi_4$ in the epoxy-siloxane polymer resulted in good conductivities but poor processibilities due to minimal pot lives and salt precipitation of the mixes. The latter problem may be resolved by using a different type of dopant, such as indicated in Example 4.

EXAMPLE 3

This example illustrates the preparation and testing of compositions in accordance with the present invention comprising an epoxy novalac resin, $LiBF_4$, and $Ta_2O_5$.

The epoxy novalac material used comprised DEN 444, obtained from Dow Chemical Corporation of Midland, Mich. Processing of the DEN 444 consisted of ball milling the $Ta_2O_5$ (at a ratio of 30%) and solvation of $LiBF_4$ (at ratios of 2% and 4%) following the same procedure as described in Example 1. Aminoethylpiperazin was added to the resulting mixes at 100% stoichiometry. The filled epoxy mixed were cast onto glass plates to form thin films of 0.0179 inches or 0.0455 cm (for the 2% $LiBF_4$ composition) and 0.0116 inches or 0.0295 cm (for the 4% $LiBF_4$ composition) and subsequently cured for sixteen hours at room temperature. The volume resistivities of the 2% $LiBF_4$/30% $Ta_2O_5$ and 4% $LiBF_4$/30% $Ta_2O_5$ films were determined to be $4 \times 10^{12}$ ohm cm and $7 \times 10^9$ ohm cm, respectively. It appeared that the exact salt concentration needed to be tailored to the polymer under investigation, based on the polymer glass transition temperature ($T_g$). Since higher $T_g$'s restrict ionic mobility in the polymer, higher concentrations of salt are needed in order to produce the semiconducting coatings of the present invention.

EXAMPLE 4

This example illustrates the preparation and testing of compositions in accordance with the present invention comprising a fluorinated polyimide resin, $Ta_2O_5$, and $LiBF_4$ or lithium perfluorooctanoate ($LiC_7F_{15}CO_2$) as previously indicated in Table II. For comparison, compositions comprising the same fluorinated polyimide resin and other additives were also prepared and tested.

The fluorinated polyimide resin used was SIXEF-44, obtained from Hoechst Celanese of Coventry, R.I. The SIXEF-44 was solvated in n-methylpyrrolidone (NMP.) The salt was incorporated into the resin as described in Example 1. The filler was ball milled in a solvent and added to appropriately solvated SIXEF-44 prior to the hand stirring in of the ethanol solvated salt. Alternately, the salt, filler, and SIXEF-44 may be solvated, or ball milled in (for filler), in propylene glycol monomethyl ether acetate and dried at 130°–200° C. The SIXEF-44 additive solutions were cast onto glass plates to form thin films (0.0010–0.004 inches or 0.0025 to 0.010 cm) thick, and dried at 200° C. (392° F.). When appropriate, $\rho_v$ and sheet resistances of both the air and the glass sides of the films and ($R_{s,air}$ and $R_{s,glass}$ respectively) were determined. Insulation resistance ($R_m$) was determined in accordance with MIL-STD-202, "Insulation Resistances," Method 302. Constant pressure was applied on the fixtured sample during measurement. Volume resistivity was calculated from the formula $\rho_v = (AR_M)/t$, where A is the area of the probe and t is the film thickness. (Since the resistance of the probe was negligible with respect to $R_m$, namely, $0.0032\Omega$ compared to values ranging from $2 \times 10^3 \Omega$ to $2 \times 10^{13} \Omega$, no probe correction factor was necessary.) A Voyager Technologies SRM-110 surface resistivity meter was used to determine $R_{s,air}$ and $R_{s,glass}$.

Specific additives indicated in Table II were prepared as followed. The $LiBF_4$ and $NaB\phi_4$ salts were dissolved in minimal amounts of ethanol (<5 milliliters) prior to being added to NMP solvated SIXEF-44. 6FDA Li was prepared by adding concentrated aqueous lithium hydroxide (LiOH) solution to 6FDA in a methanol/NMP solvent blend followed by reaction at ambient temperature for sixteen hours. After concentrating tee resulting adduct using a rotary evaporator, it was filtered prior to incorporation into NMP solvated SIXEF-44. 6FPA-Li was prepared from 6FPA using a similar procedure, with polyamic acids being formed having 1:2 molar ratios of 6FDAM to 6FDA. In addition to the LiOH doping, polyamic acids salts (1:1 molar ratio 6FDAM to 6FDA) were formed with Hoechst Celanese provided perfluorooctanoic acid lithium salt, ($C_7F_{15}CO_2Li$). The polyamic acid salt was cast into a thin film and imidized, as well as being added to SIXEF-44 and cured.

The KZ TPP and LZ 97 zirconates, KR55 titanate, and Ag/Ni spheres, were added neat (i.e. pure) to NMP solvated SIXEF-44. Nafion 1100, commercially available as a five percent solution in an alcohol blend, was rediluted in NMP and concentrated using a rotary evaporator prior to addition to NMP solvated SIXEF-44.

The $Ta_2O_5$ was ball milled (into Freon TF or a tetrahydrofuran (THF)/toluene blend), dried at 250° F. (121° C.) and ground using a mortar and pestle immediately prior to adding it to appropriately solvated SIXEF-44. When the $Ta_2O_5$ was sized with phenetyltrimethoxy-silane in a Freon TF medium, it was dried at 250° F. (121° C.) and also ground using a mortar and pestle immediately prior to adding it t dimethylacetamide (DMAc) solvated SIXEF-44. The (ethanol solvated) $LiBF_4$ salt or neat $C_7F_{15}CO_2Li$ were then stirred in by hand, as was the zircoaluminate coupling agent. Optionally, a wetting agent, such as Fluorad FC 430 available from 3M Company of St. Paul, Minn., may be used for the resin in order o reduce surface defects in the final film. NMP was replaced with colorless Freon TF, DMAc (heated to $\leq 175°$ C. just to dry the film), THF/toluene blend, $\gamma$-butyrolactone, or propylene glycol monomethylether acetate blend in order to eliminate the yellowish cast found in the resulting polyimide films. The additive concentrations, as well as the resulting film $\rho_v$, $R_{s,glass}$, $R_{s,air}$ and appearance were as previously indicated in Table II.

Films were formed from a composition comprising 40 phr $C_7F_{15}CO_2Li$ in SIXEF-44, cast from DMAc and dried at 204° C. (400° F.). These films exhibited ambient temperature tensile strengths of 6800 pounds per square inch (psi) or 46.9 megapascals minimum and elongation of 8 percent minimum. These values are approximately one-half the strength of films of pure SIXEF-44, but equivalent to the elongation of films of pure SIXEF-44 when dried at 204° C. (400° F.). These films in accordance with the present invention exhibited volume resistivities of $4 \times 10^{10}$ ohm-cm and surface resistivities of $10^{10}$ ohms per square. These compositions passed the outgassing requirements of the National Aeronautics and Space Administration (NASA), namely, <1% total adjusted mass loss (i.e., total mass loss minus water vapor recovered) and $\leq 0.10\%$ collectible volatile condensable materials, and thus are suitable for space applications. In addition, these outgassing test results provide proof that the dopant is incorporated in the polymer chain in accordance with the present invention. Otherwise, the dopant would have out-gassed under these tests due to its low molecular weight.

Additional films were cast from the same composition just described except using propylene glycol monomethyl ether acetate and drying at 150° C. These films exhibited volume resistivities of $3 \times 10^{11}$ ohm-cm and surface resistivities of $10^{10}$ ohms per square. These films are expected to have similar mechanical properties to the previously described films.

Other films were formed from a composition comprising 40 phr $C_7F_{15}CO_2Li$ and 3 phr triethanolamine in SIXEF-44. These films had volume resistivities of $3 \times 10^{10}$ ohm-cm and surface resistivities of $10^9$ ohms per square, which indicates that the triethanolamine may act as a stabilizer in such compositions.

While $LiBF_4$ and $NaB\phi_4$ (items 7 and 8 of Table II) reduced the $\rho_v$ of the SIXEF-44 film three or four orders of magnitude over the unmodified material, film clarity was not maintained due to salt precipitation. This well documented "salting out" phenomenon was evidence by the difference in $R_{s,air}$ and $R_{s,glass}$ for the $LiBF_4$ specimen. Miscibility and clarity were obtained by employing limiting concentrations of 6FDA-Li, 6FPA-Li, or 6FPA-$C_7F_{15}CO_2Li$. While the clear 75 parts per hundred resin 6FPA Li/SIXEF-44 film possessed a low $R_{s,air}$ ($10^7$–$10^{12}\Omega/\square$), its poor handleability prevented further measurements. The ductile 6FPA-$C_7F_{15}CO_2Li$/SIXEF-44 film possessed the lowest measured $\rho_v$ ($3 \times 10^{12}\Omega$-cm) of the clear ionically conducting materials. The voids generated in these polyamic acid salt samples resulted from the imidization reaction. Cure cycle modifications can greatly reduce or eliminate this defect.

The Nafion 1100/SIXEF-44 film exhibited opacity (due to immiscibility of the two components) and excessive shrinkage (due to Nafion's high moisture/solvent uptake and subsequent release during drying). Although this specimen exhibited film integrity, its poor surface characteristics did not allow electrical measurements to be taken. The neoalkox titanates and zirconates examined in this study were not effective in the SIXEF-44 system. Addition of either zirconate (KZ TPP or LZ 97) to SIXEF-44 resulted in rapid gelation of the solvated mix. Inclusion of the more compatible KR 55 had no effect, altering neither the color nor the (lack of) conductivity of the resulting film.

Particulate agglomeration was seen in SIXEF-44 films for both filler loading levels (5 phr and 30 phr) of the Ag/Ni spheres due to the large screen size (250 mesh, 63 microns) of the bulk material. (In comparison, the individual spheres have diameters of 10 microns.) Compared to unfilled SIXEF-44, significant decreases for resistivity were seen in both samples ($2 \times 10^{12}\Omega$-cm and $2 \times 10^3\Omega$-cm for 5 phr and 30 phr, respectively), with the 5 phr specimen exhibiting clarity in sections.

Although Example 2 showed that a blend of 30 phr $Ta_2O_5$ to 2 phr $LiBF_4$ gave a $\rho_v$ of $1 \times 10^8\Omega$-cm in a low $T_g$ ($-24°$ C.) epoxy-siloxane polymer, this was not the case for the high $T_g$ ($\geq 290°$ C.) SIXEF-44 resin ($\rho_v = 2 \times 10^{13}\Omega$-cm). This higher $T_g$ acts to restrict ion mobility in the polymer, decreasing the efficacy of ion complexation. By increasing the concentration of the $LiBF_4$ ionic conducting salt to 4 phr, a $\rho_v$ of $3 \times 10^{10}\Omega$-cm was obtained in white $Ta_2O_5$ filled SIXEF-44 film. This $LiBF_4$ concentration appears to be an upper limit in this particular case, since the 5 phr $LiBF_4$/30 phr $Ta_2O_5$ film exhibited the salting out phenomenon seen previously with $LiBF_4$ alone. Use of the $C_7F_{15}CO_2Li$ salt with either zircoaluminate sized $Ta_2O_5$ (via integral addition to the resin) or silane (presized) $Ta_2O_5$ gave homogeneous films with $\rho_v$ values of $4$-$7 \times 10^{11}\Omega$-cm and $R_{s,air}$ and $R_{s,glass}$ between $10^{10}$ and $10^{11}$ ohms per square. No $\rho_v$ gradients were detected through the film thicknesses.

EXAMPLE 5

This example illustrates the formation and testing of metallized films in accordance with the present invention.

Films were formed rom compositions in accordance with the present invention comprising: (a) SIXEF-44, 4 phr $LiBF_4$, and 30 phr $Ta_2O_5$ and (b) SIXEF-44, 80 phr $C_7F_{15}CO_2Li$ and 30 phr $Ta_2O_5$ as previously indicated in Table III. Some of the films were metallized, and all films were tested, with the results as previously indicated in Table III.

As expected, the unmetallized SIXEF-44 filled systems gave lower $\alpha_s/\epsilon_{TN}$ values than Kapton ($\alpha_s/\epsilon TN = 0.77$), with slightly to significantly higher $\alpha_s/\epsilon_{TN}$ values than 0.002 inch thick aluminized Teflon ($\alpha_s/\epsilon_{TN} = 0.25$). While vapor deposition of silver significantly reduced $\alpha_s/\epsilon_{TN}$ of the SIXEF-44 filler systems to those approximating aluminized Teflon (but still significantly lower than 0.002 inch thick aluminized Kapton $\alpha_s/\epsilon_{TN} = 0.69$), use of a chromium strike on the SIXEF-44 films prior to silver deposition increased $\alpha_s/\epsilon_{TN}$ to values exceeding those of the unmetallized films. These results indicate that by silver metallizing semiconducting SIXEF-44 systems in accordance with the present invention, thermal balance may be significantly improved and spacecraft electrostatic discharge protection provided in applications where Kapton is currently utilized (i.e., thermal blankets). Where electrostatic discharge protection is critical and slight increases in satellite temperature can be tolerated, these metallized SIXEF-44 films of the present invention may also be able to replace aluminized Teflon.

Having thus described exemplary embodiments of the present invention, it should be noted by those skilled in the art that the disclosures within are exemplary only and that various other alternatives, adaptations and modifications may be made within the scope of the present inventions. Accordingly, the present invention is not limited to specific embodiments as illustrated herein, but is only limited by the following claims.

What is claimed is:

1. A method for protecting a body in space against both electrostatic discharge and thermal effects comprising providing in proximity to the surface of said body a layer of a polymer comprising:
(a) a chosen polymer which is an electronic insulator and which is resistant to ultraviolet radiation, high energy particles, and elevated temperature; and
(b) a dopant incorporated in said chosen polymer in a predetermined amount, and being selected from the group consisting of lithium tetrafluoroborate and a compound having Formula I

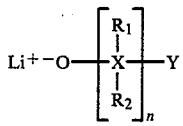

Formula I where X is selected from the group consisting of:

,

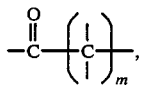,

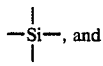, and

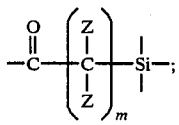;

n=1 to 11,
m=3 to 11,
Y=H, C1 to C4 alkyl, OH, or halogen,
Z=H or halogen,,
$R_1$ and $R_2$ are each a substituent compatible with the polymer;
wherein said layer of said polymer is uniformly semiconductive, has a volume resistivity of about $10^6$ to $10^{11}$ ohmcentimeter and a value of solar absorptance/total normal emittance within the range of about 0.305 to 0.595 to thereby protect said body against both said electrostatic discharge and thermal effects.

2. The method of claim 1 wherein said dopant is mixed with the precursor of said chosen polymer to form a mixture and said mixture is polymerized to form said layer.

3. The method of claim 2 wherein said chosen polymer is selected from the group consisting of epoxy, epoxy-siloxane, epoxy-silane, silicone, and polyimide-siloxane.

4. The method of claim 1 wherein said composition further comprises tantalum pentoxide.

5. The method of claim 4 wherein said tantalum pentoxide is present in the amount of 0.1 to 80 parts per hundred resin or polymer.

6. The method of claim 1 wherein said dopant is mixed with said chosen polymer to form a mixture and said mixture is formed into said layer.

7. The method of claim 6 wherein said chosen polymer is selected from the group consisting of fluorinated polyimide, fluorinated polyester, and fluorinated polyimide-siloxane.

8. The method of claim 7 wherein said chosen polymer is selected from the group consisting of fluorinated polyester and fluorinated polyimide siloxane and said composition further comprises tantalum pentoxide.

9. The method of claim 8 wherein said tantalum pentoxide is present in the amount of 0.1 to 80 parts per hundred polymer.

10. The method of claim 1 wherein said dopant is present in the amount of 1 to 75 parts per hundred resin or polymer.

11. The method of claim 1 wherein said layer has a thickness within the range of 0.0002 to 0.0889 centimeter (0.0001 to 0.035 inch).

12. The method of claim 1 wherein said layer is coated directly on said surface of said body.

13. The method of claim 1 wherein said layer comprises a free-standing film.

14. The method of claim 13 wherein at least one surface of said film is coated with a chosen metal.

15. The method of claim 14 wherein said metal comprises silver.

16. The method of claim 14 wherein a plurality of said films coated with said metal are stacked one upon another.

17. The method of claim 16 wherein a plurality of said films coated with said metal are attached to one another.

* * * * *